No. 750,555. PATENTED JAN. 26, 1904.
D. J. PRENDERGAST, V. H. SLINACK & T. WILSON.
STREET LIGHT.
APPLICATION FILED JUNE 3, 1901.
NO MODEL. 2 SHEETS—SHEET 1.
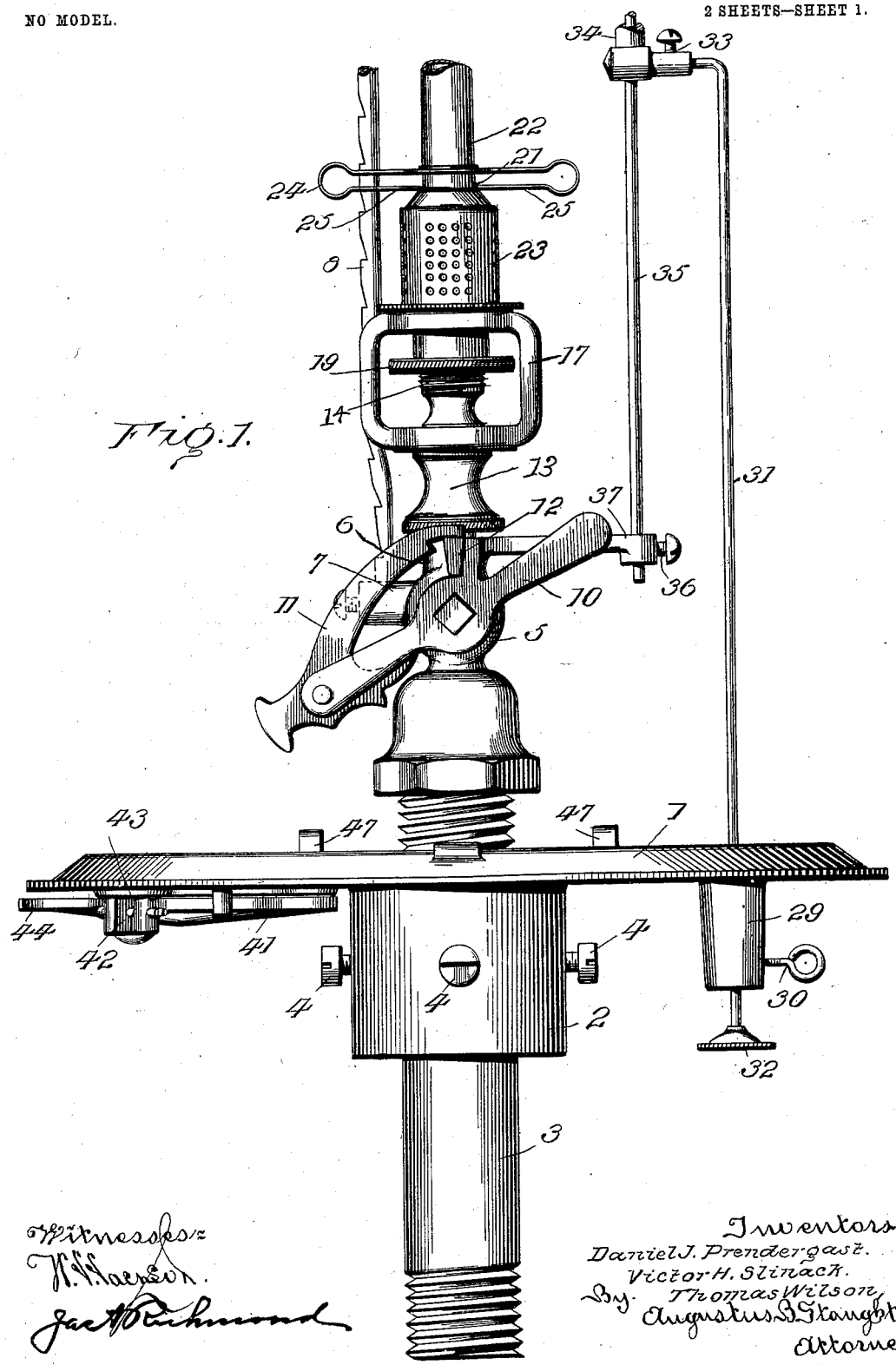

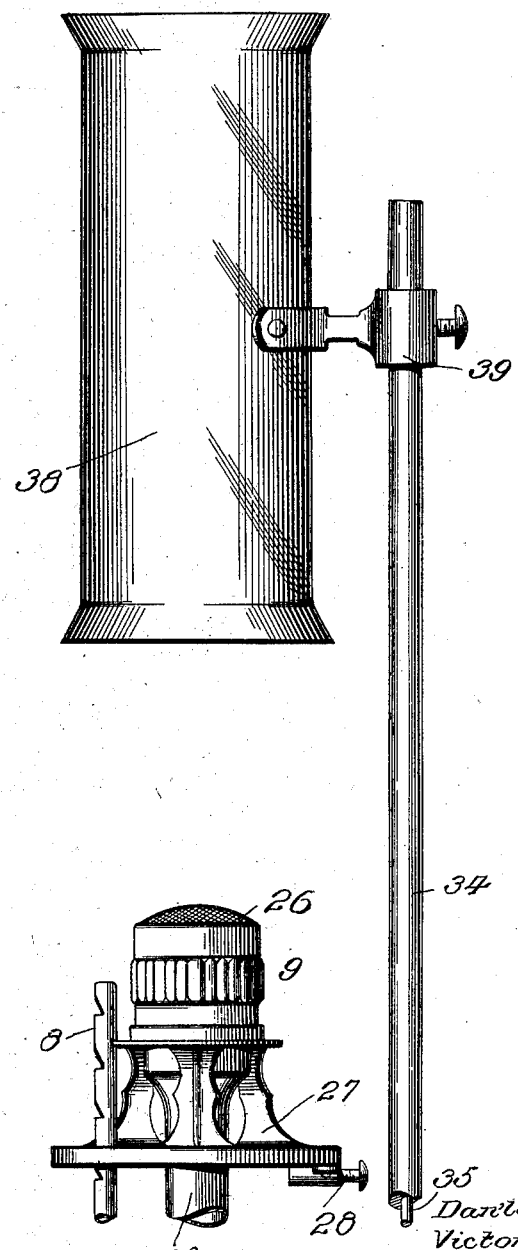

No. 750,555.                                                                                                      Patented January 26, 1904.

UNITED STATES PATENT OFFICE.

DANIEL J. PRENDERGAST, OF NEW YORK, N. Y., AND VICTOR H. SLINACK AND THOMAS WILSON, OF PHILADELPHIA, PENNSYLVANIA, ASSIGNORS TO PENNSYLVANIA GLOBE GAS LIGHT COMPANY, OF PHILADELPHIA, PENNSYLVANIA, A CORPORATION OF PENNSYLVANIA.

STREET-LIGHT.

SPECIFICATION forming part of Letters Patent No. 750,555, dated January 26, 1904.

Application filed June 3, 1901. Serial No. 63,008. (No model.)

*To all whom it may concern:*

Be it known that we, DANIEL J. PRENDERGAST, residing at New York city, in the county and State of New York, and VICTOR H. SLINACK and THOMAS WILSON, residing at Philadelphia, in the county of Philadelphia and State of Pennsylvania, citizens of the United States, have jointly invented certain new and useful Improvements in Street-Lights; and we do hereby declare that the following is a full, clear, and exact description of the same, such as will enable others skilled in the art to which it appertains to make and use the same.

The object of the invention is to improve the general construction of Welsbach and other incandescent street-lights and to simplify, cheapen, and render the same more efficient as a whole.

The nature, characteristic features, and scope of the invention will be more clearly understood by reference to the accompanying drawings, forming a part hereof, in which—

Figure 1 is an elevational view, partly broken away, of a Welsbach light embodying features of the invention; and Fig. 2 is an elevational view showing the burner and mantle protector in their general arrangement or relation to each other.

Having reference to the drawings, 1 designates the base of a lantern, having a central tubular portion 2 for the passage of the coupling 3, said tubular member being provided with set-screws 4. The coupling 3 is threaded for attachment of the gas-valve 5 and of a gas-supply connection, (the latter not being illustrated,) and said gas-valve 5 is provided with vertical and transverse discharge-vents 6 and 7, whereof the transverse vent or passage communicates with a pilot 8 and the vertical passage with the main burner, which may be referred to as 9. The gas-valve is operated by a lever 10, having a circumscribed arc of movement that is governed by a pawl 11, adapted for engagement with a projection 12 of the valve.

Interposed between the main burner and the gas-valve is a suitable supply-passage 13, provided with the usual needle-valve 14 and with a yoke 17. The needle-valve has an adjustable seat 19 located within the yoke 17, as shown in Fig. 1.

Upon the upper threaded portion 20 of the yoke 17 is mounted a Bunsen tube 21, that receives the burner 22 and into which the valve-seat 19 projects, and said Bunsen tube has a perforated sleeve 23 to increase or diminish the air-supply, which may be increased or diminished to admit more or less air to the tube, as will be well understood by those skilled in the art.

24 is spring member having a circular part or ring to fit over the Bunsen tube 21 and having the inwardly-bent arms 25, which rest upon the flanged portion of said tube. The burner-tube is yieldingly supported upon said spring member, and thus the latter prevents the transmission of jars or vibratory movements liable to damage the mantle.

The burner-tube is provided with the cap 26 and with the ring or skirt 27, the latter being served with means, as 28, for the reception of a mantle-support.

Referring once more to the base 1 of the lamp, it will be seen that the same is provided with a socket 29, having means, as 30, for adjustably securing a rod 31, which has a milled head 32. The rod 31 is bent inwardly at its upper end for engagement with a clamping member 33, that has the upwardly-extending sleeve 34. The latter has a telescoping rod 35, that is secured by a set-screw 36 in a lateral support or projection 37, coextensive with the gas-valve. The sleeve 34 serves to carry a mantle protector or tube 38, which is rendered adjustable and movable concentrically in respect to the burner by means of a collar 39, adapted to slide on said sleeve.

The gas-valve is operated through an opening 40, which may be closed by a perforated door 41, provided with a bifurcated portion 42, which has pivotal engagement with a stationary part 43 of the base, whereby the door is movable radially of said opening. The door has a peripheral extension 44, by means of which it can readily be opened by a hand-torch, which is then thrust through the opening to actuate the lever for effecting communication with the pilot and burner, respectively. Said door also has an ear 45, which engages a stop 46, as seen in Fig. 3. 47 represents spring-clips for securing removable parts (not shown) of the lantern-base.

It will be obvious to those skilled in the art to which the invention appertains that modifications may be made in details without departing from the spirit and scope of the invention. Hence we do not limit ourselves to the precise construction and arrangement of parts hereinabove described, and illustrated in the accompanying drawings; but,

Having thus described the nature and objects of the invention, what we claim as new, and desire to secure by Letters Patent, is—

The combination of a lantern-base, a gas-valve sustained thereby, an incandescent burner mounted in relation to said valve and served with a mantle, a support projecting from the casing of the valve, an upright capable of vertical adjustment in said support, a sleeve adjustable on said upright, a tube carried by said sleeve adapted to cover and uncover the mantle, and a support for said sleeve capable of vertical adjustment in the lantern-base, substantially as described.

In testimony whereof we have hereunto signed our names in the presence of two subscribing witnesses.

DANIEL J. PRENDERGAST.
VICTOR H. SLINACK.
THOMAS WILSON.

Witnesses:
W. J. JACKSON,
FRANK T. KALAS.